US011612838B2

(12) United States Patent
Dube et al.

(10) Patent No.: US 11,612,838 B2
(45) Date of Patent: Mar. 28, 2023

(54) FILTER CLEANING STAND

(71) Applicants: Jordan Dube, Las Vegas, NV (US); Thomas H. Dube, Las Vegas, NV (US)

(72) Inventors: Jordan Dube, Las Vegas, NV (US); Thomas H. Dube, Las Vegas, NV (US)

( * ) Notice: Subject to any disclaimer, the term of this patent is extended or adjusted under 35 U.S.C. 154(b) by 0 days.

(21) Appl. No.: 17/706,190

(22) Filed: Mar. 28, 2022

(65) Prior Publication Data

US 2022/0305411 A1 Sep. 29, 2022

Related U.S. Application Data

(60) Provisional application No. 63/166,935, filed on Mar. 26, 2021.

(51) Int. Cl.
*B01D 29/64* (2006.01)

(52) U.S. Cl.
CPC .... *B01D 29/6438* (2013.01); *B01D 2201/081* (2013.01)

(58) Field of Classification Search
CPC ............... B01D 29/96; B01D 29/6438; B01D 2201/081; B01D 41/00; B01D 41/04; B08B 9/0813; B08B 9/023
See application file for complete search history.

(56) References Cited

U.S. PATENT DOCUMENTS

| 3,620,234 | A | * | 11/1971 | Everroad | B01D 46/521 |
| | | | | | 134/102.1 |
| 4,299,245 | A | * | 11/1981 | Clapper | B08B 3/02 |
| | | | | | 134/140 |
| 6,041,797 | A | * | 3/2000 | Casselman | B65C 9/00 |
| | | | | | 134/152 |
| 11,052,340 | B1 | * | 7/2021 | Boesel | B08B 3/024 |
| 2007/0246087 | A1 | | 10/2007 | Crawford et al. | |
| 2010/0300494 | A1 | | 12/2010 | Corailler et al. | |
| 2011/0226291 | A1 | | 9/2011 | Toussaint | |

OTHER PUBLICATIONS

"Spin-N-Free Filter Cleaner—SF-1000," INYOPOOLS.com. https://www.inyopools.com/Products/00100028009757.htm [date accessed: Jan. 6, 2021].
"Paper Holder with One Open Side," Topjle.com. http://www.topjle.com.tw/en/product/HS7209S.html [date accessed: Jan. 6, 2021].
"How to clean a pool cartridge filter," pinchapenny.com. https://pinchapenny.com/pool-life/how-to-clean-your-pool-cartridge-filter [date accessed: Jan. 6, 2021].
"Estelle Spa Filter Cleaning System," estelle-dcs.com. https://www.estelle-dcs.com/ [date accessed: Jan. 6, 2021].
"Blaster Automatic Filter Cleaners," neoterics.co. https://www.neoterics.com/ [date accessed: Jan. 6, 2021].

\* cited by examiner

*Primary Examiner* — Terry K Cecil
(74) *Attorney, Agent, or Firm* — Bold IP, PLLC; Christopher Mayle (57) ABSTRACT

The present invention is a filter cleaning stand which provides a solution to the problem of convenient cleaning of a cartridge filter while also containing the wastewater generated while cleaning the cartridge filter. The core components of the invention are a base, a raised platform and a wall that partially encloses the filter. Generally speaking, the components are configured as follows: the raised platform is above the base and arranged to support a filter and allow water to pass under the raised platform, and the wall is above the base and is arranged to partially enclose the filter on the raised platform.

17 Claims, 12 Drawing Sheets

FILTER CLEANING STAND

CROSS REFERENCE TO RELATED APPLICATIONS

This application claims priority to U.S. Provisional Patent No. 63/166,935 filed on Mar. 26, 2021 which is incorporated in its entirety.

BACKGROUND

Cartridge filters are used in various water filtration systems. For example, pool filters are often cartridge filters. Cartridge filters must be cleaned periodically. Normally, cartridge filters are cleaned in one of two ways.

The first way cartridge filters are normally cleaned is using a large filter cleaning machine. The cartridge filter is placed in the large filter cleaning machine (which normally totally encases the filter). The machine sprays water on the filter and sometimes spins the filter to clean the filter. In some of these large filter cleaning machines the wastewater is contained. This method requires large and sometimes very expensive equipment, which is inconvenient to move around, inconvenient to store, and often difficult to use.

The second way cartridge filters are normally cleaned is by spraying the filter with a hose or other water source. Because of the inconvenience and expense of using the large cleaning machines, often owners of a pool for individual or family use will simply spray the filter with a hose to clean the filter in a very inexpensive manner. The material on a dirty pool filter can often smell. The filter is generally not enclosed and wastewater often gets sprayed over a large area which is left to dry on the street or yard. Thus, this method can create a big smelly mess.

SUMMARY

The disclosed device is unique when compared with other known devices and solutions because it provides a convenient and cost-efficient means for holding a filter while it is being cleaned and also provides a method of containing or eliminating waste water to reduce the mess created by cleaning a filter such as a cartridge filter and reclaims water.

The disclosed device is unique in that it is structurally different from other known devices or solutions. More specifically, the device is unique due to the presence of: (1) a raised platform arranged to support the filter and allow water to pass under the platform; and (2) a wall arranged to partially enclose a filter.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limits include both numbers. For example, "25 to 100" means a range whose lower limit is 25 and upper limit is 100 and includes both 25 and 100.

Figure 1:
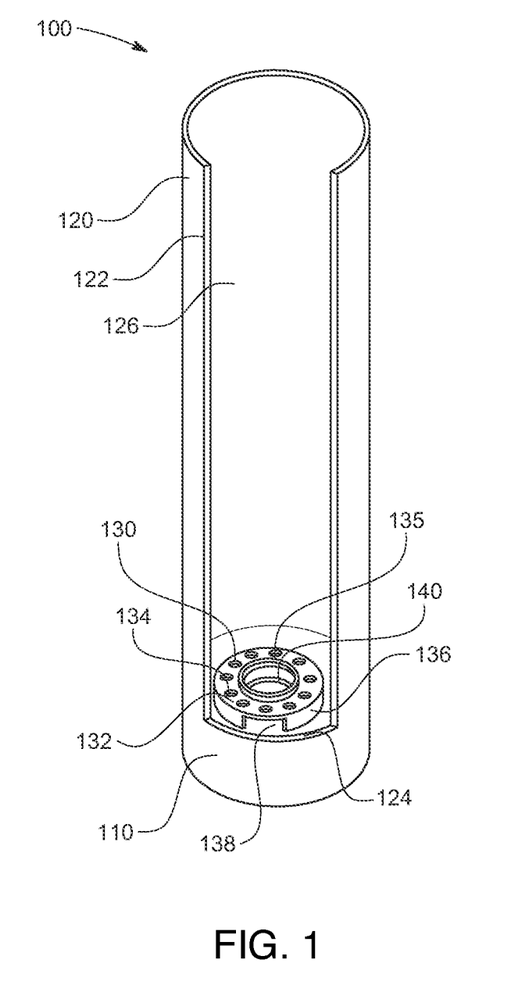
FIG. 1 shows an example front view of a filter cleaning stand.
Figure 2:
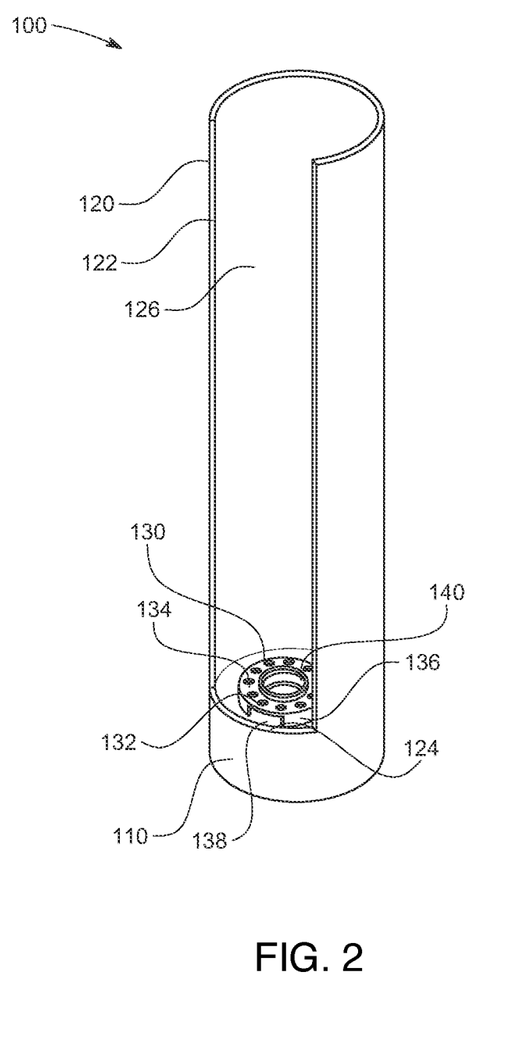
FIG. 2 shows an example front-side view of the filter cleaning stand.

FIG. 1 shows an example front view of a filter cleaning stand 100. FIG. 2 shows an example front-side view of the filter cleaning stand 100. The filter cleaning stand 100 may include a base 110, a wall 120, and a platform 130. The base 110 and the platform 130 may define a drain 140 which is an opening that allows water and other substances to drain out of the filter cleaning stand 100. The filter cleaning stand 100 may comprise plastic, ceramic, metal (preferably metals which are not easily corroded by exposure to water) or other materials suitable for supporting a filter and containing water. The wall 120 may extend upward from the base 110 and include a taller portion 122 and a shorter portion 124. The taller portion 122 and shorter portion 124 may define an opening 126 in the side of the wall 120. The taller portion 122 may be about 8-38 inches tall. The shorter portion 124 may be a lip about 1-2 inches tall.

Accordingly, in some embodiments the taller portion 122 may be at least 5 times taller than the shorter portion 124. In other embodiments, the taller portion 122 may be at least 10 times taller than the shorter portion 124. The shorter portion 124 and the taller portion 122 may connect such that the wall 120 forms a ring (or other shape) above the base 110 and around the platform 130. Restated, the base 110, the shorter portion 124 and taller portion 122 together form a cup shape (with the taller portion 122 extending above the cup shape and portions of the base 110 extending below the cup shape) around the drain 140 arranged to cause water to go down the drain 140. The shorter portion 124 may have the same height (e.g., extend the same distance above the base 110 from the perspective to FIG. 1) as the platform 130.

The wall 120 may have a generally tubular shape with the opening 126 being a cut out (or otherwise removed) section of the tubular shape. The wall 120 may have a diameter of about 3-7 inches in some embodiments. For embodiments meant for filters of different sizes, the diameter of the wall may be adjusted to fit that filter (e.g., the wall 120 may have a diameter of 9 inches to fit a filter with an 8-inch diameter).

In some non-limiting embodiments The platform 130 may include top 132 with holes 134 defined by the top 132, and legs 136, with holes 138 defined between the legs 136. The top 132 may also include a ridge 135 that assists in securing a filter. In some embodiments, the holes 138 may be defined by the legs 136, the top 132, and the base 110. the top 132 may define a portion of the drain 140 and may be a disc with a diameter about 50-80 percent of the diameter of the wall 120. The top 132 may be centered in the wall 120 with gaps between the top 132 and the wall 120 for water to pass down to the drain 140. The holes 134 and 138 may also be arranged to allow water to pass to the drain 140. The holes 134 may be circular and may have a diameter about 1 inch in some embodiments. In other embodiments the holes 134 may have other shapes. The holes 138 may be rectangular in shape between the legs 136, the top 132, and the base 110. In some embodiments the holes 138 may have a round shape or another shape. The holes 138 may have a similar size as the legs 136.

Figure 3:
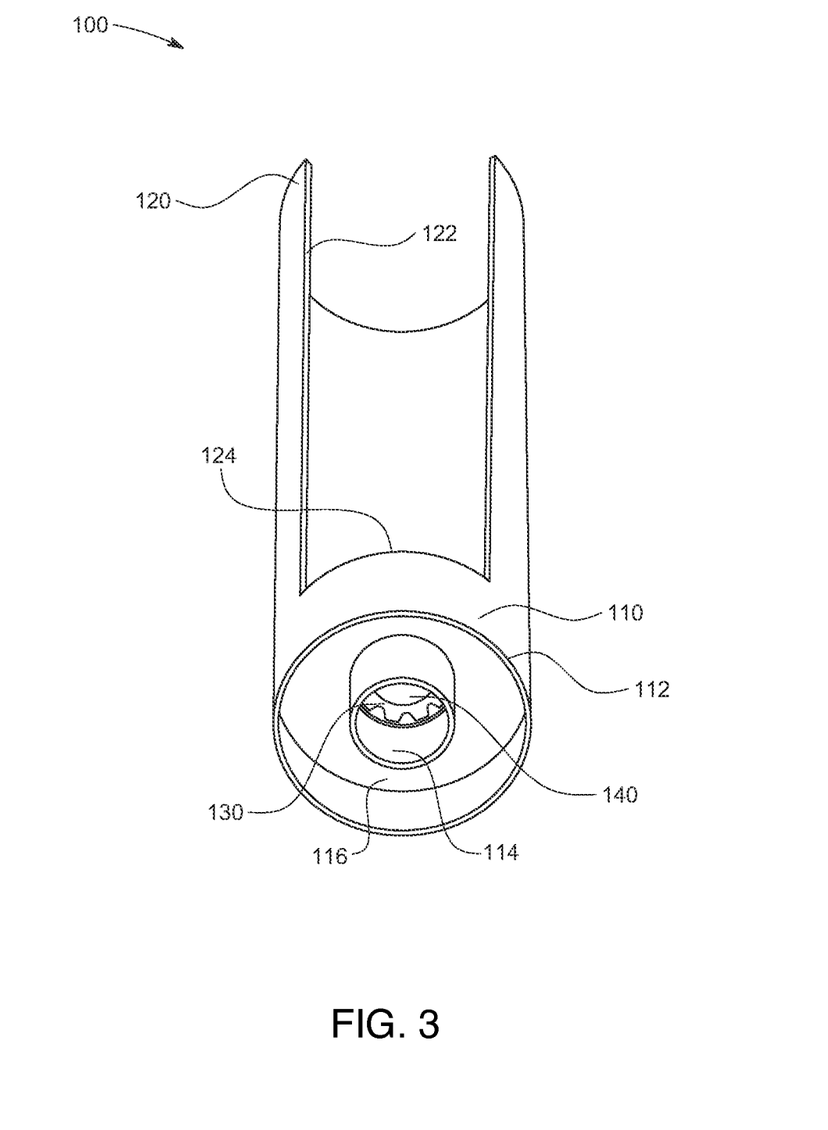
FIG. 3 shows an example bottom-front view of the filter cleaning stand.

FIG. 3 shows an example bottom-front view of the filter cleaning stand 100. The base 110 may include an outer ring 112, an inner ring 114, and a top 116. The inner ring 114 may partially define the drain 140. The inner ring 114 may have a diameter of about 2-4 inches and a height of about 1-3 inches, although other sizes and arrangements are also possible. In some embodiments, the inner ring 114 may include threading, latches, or other devices for attaching the filter cleaning stand 100 to a water collection device 300 (shown in FIG. 6). The outer ring 112 may have the same height (e.g., extend the same distance down from the top 116) as the inner ring 114. The top 116 may have a disc shape with a hole in the center partially defining the drain 140. The filter cleaning stand 100 may have an overall cylindrical shape such that outer ring 112 and the wall 120 have the same diameter and may be formed from a single cylindrical pipe.

Figure 4:
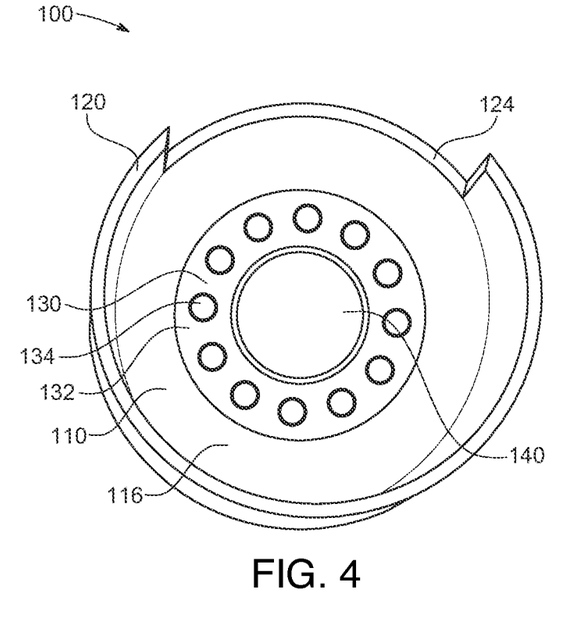
FIG. 4 shows an example top view of the filter cleaning stand.

FIG. 4 shows an example top view of the filter cleaning stand 100. The taller portion 122 may be about 270 degrees of a circle when viewed from above. In some embodiments, the taller portion 122 may be between 180 degrees and 330 degrees of a circle. The drain 140 may be defined by the platform 130 and the base 110 such that the drain 140 extends vertically down (from the perspective of FIG. 1) with a diameter in the horizontal plane of about 30-50% the diameter of the wall 120. The drain 140 may also have different shapes and alignments. The top 116 may extend from the wall 120 to the drain 140 with a slope (e.g., cup shape) such that water may be directed to the center of the top 116 (via the holes 138) and the drain 140 defined in the center of the top 116.

Figure 5:
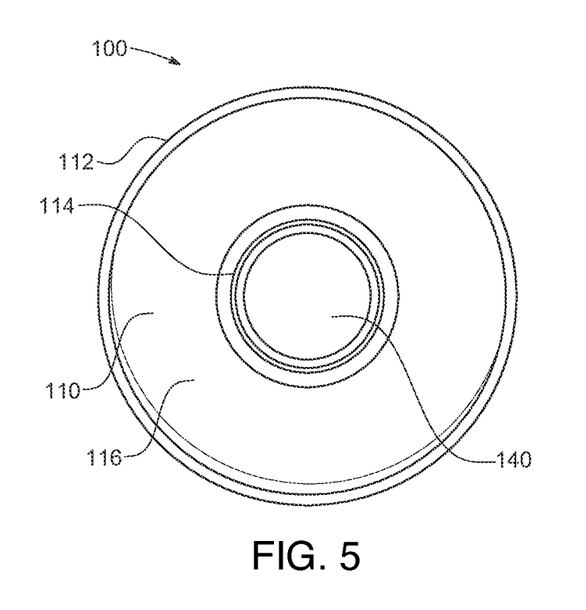
FIG. 5 shows an example bottom view of the filter cleaning stand.

FIG. 5 shows an example bottom view of the filter cleaning stand 100. The top 116 may extend from the inner ring 114 to the outer ring 112. The thickness of the inner ring 114, the outer ring 112, and top 116 may depend on the materials used in the base 110. For example, if the base is made of a plastic such as PVC (polyvinyl chloride), the inner ring 114 and the outer ring 112 may be about 0.12 inches thick. If the base is made of corrosion resistant metal such as brass or plastic, the outer ring 112, inner ring 114, and top 116 may have a thickness of about 0.2 inches. Similarly, the thickness of the wall 120 and the platform 130 may be determined by the materials of these elements. The outer ring 112 extends around (e.g., encircles) the inner ring 114.

Figure 6:
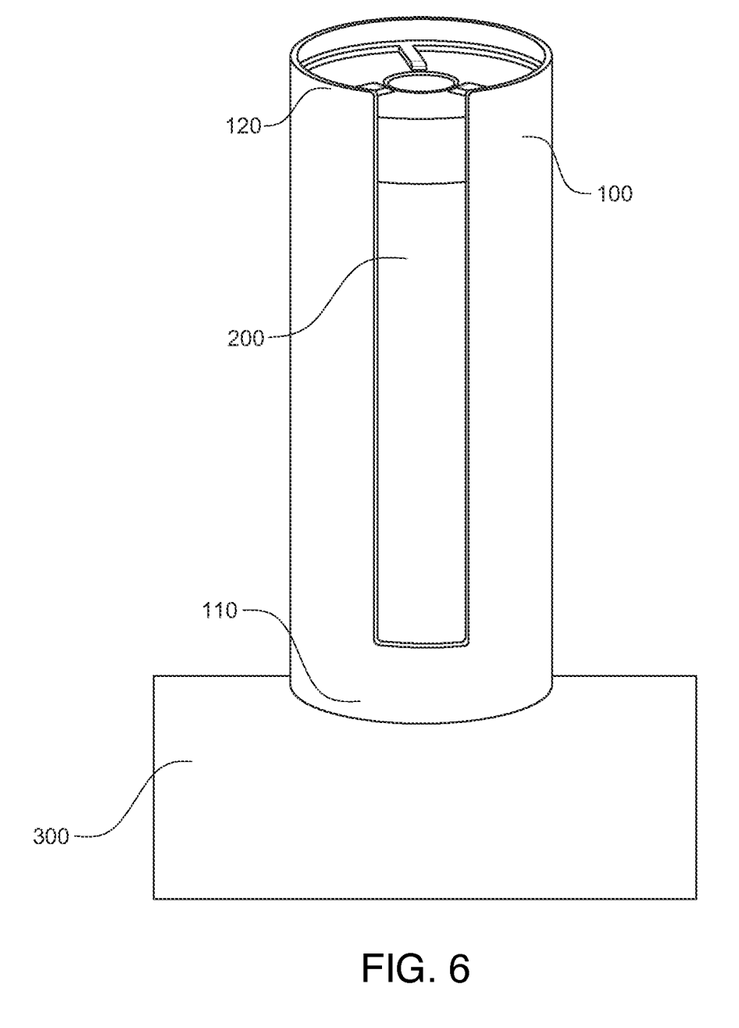
FIG. 6 shows an example front view of the filter cleaning stand with a filter and water collection device.
Figure 7:
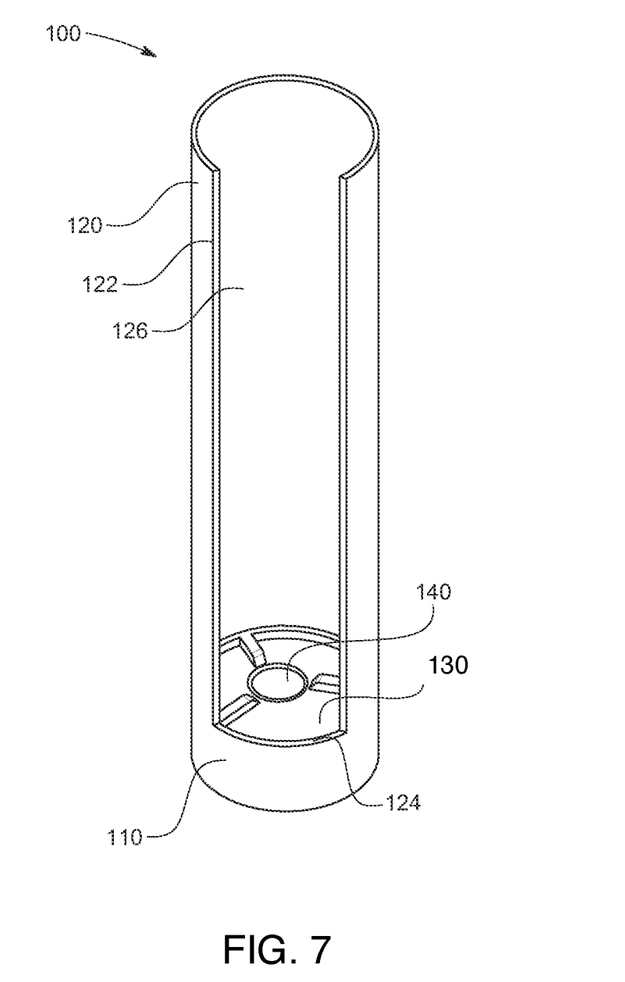
FIG. 7 shows another example of a second embodiment of the filter cleaning stand.
Figure 8:
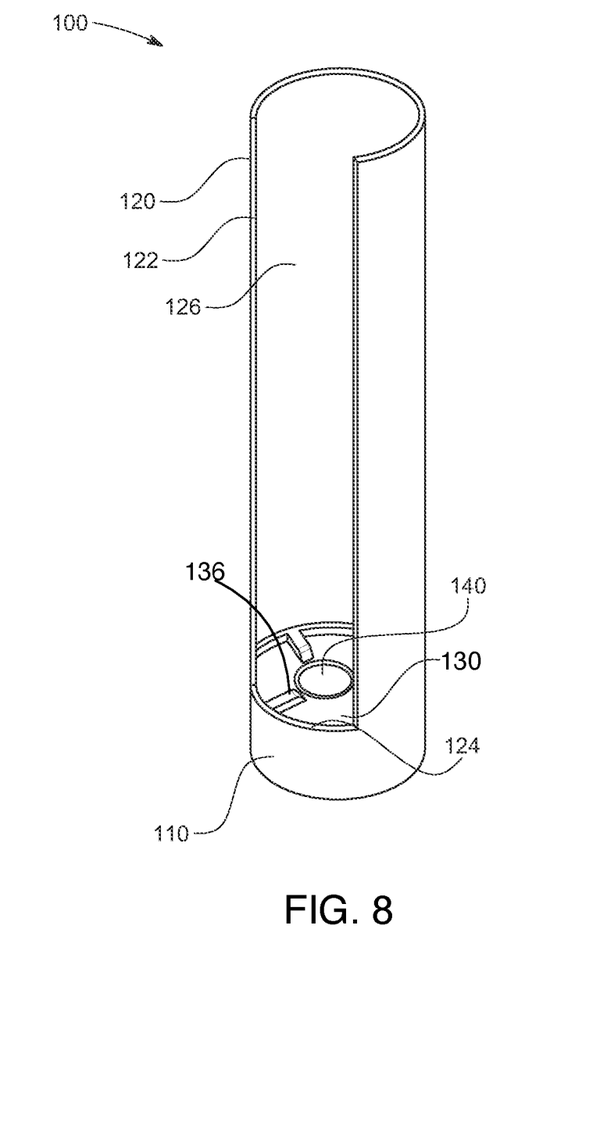
FIG. 8 shows an example front-side view of the filter cleaning stand.
Figure 9:
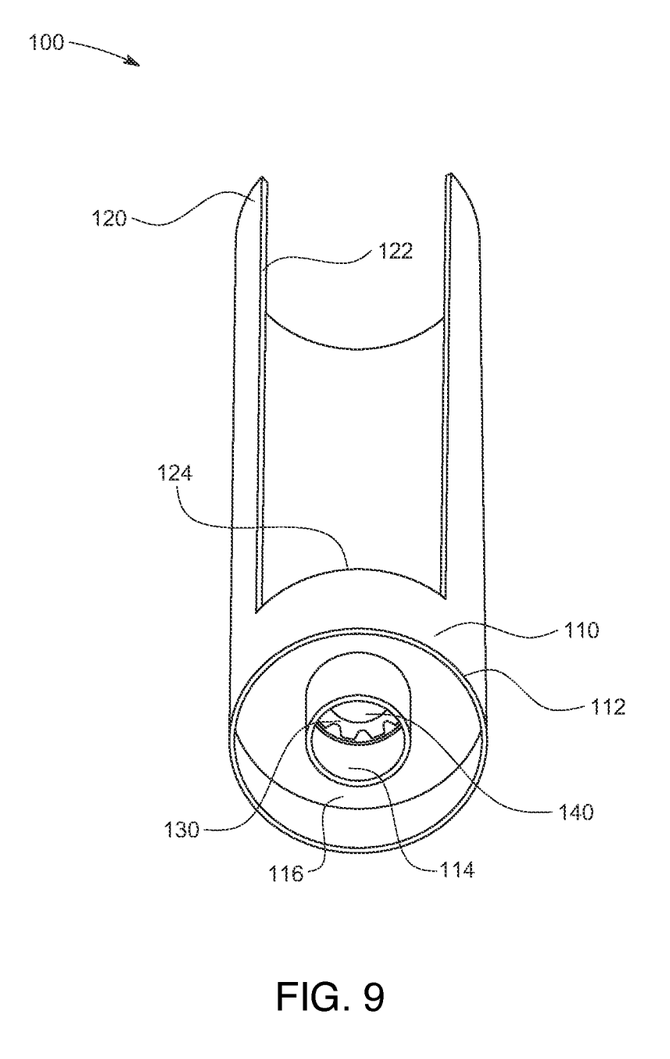
FIG. 9 shows an example bottom-front view of the filter cleaning stand.
Figure 10:
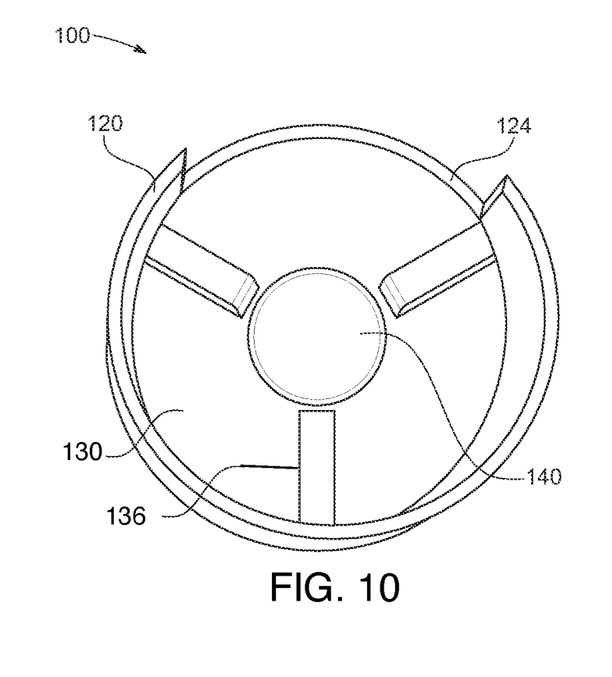
FIG. 10 shows an example top view of the filter cleaning stand.
Figure 11:
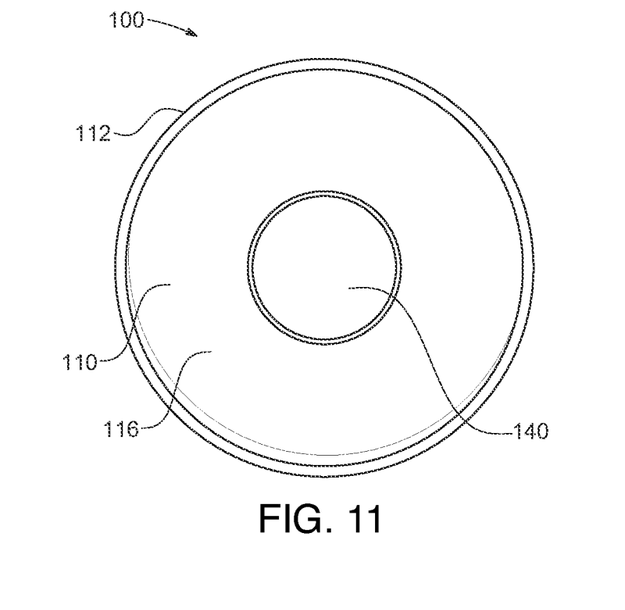
FIG. 11 shows an example bottom view of the filter cleaning stand.

FIG. 6 shows an example front view of the filter cleaning stand 100 with a filter 200 and water collection device 300. The filter cleaning stand 100 may be arranged to have the filter 200 slide into the wall 120 such that the wall 120 partially encases the filter 200. In some non-limiting embodiments wall 120 is removably attached to top 116 such that it may be removed for transportation and storage. The filter cleaning stand 100 may have an open top so the filter 200 may slide into the middle of the wall 120. The filter 200 may be a cartridge filter. Cartridge filters are often cylindrical in shape and have a hole passing from the top to the bottom of the cylinder. The ridge 135 of the platform 130 (not shown in this figure) may be arranged to sit in the hole of the filter 200 to secure the filter 200 in place.

The water collection device 300 may be a bucket, a house's main sewer drain, or other form of water capturing or retaining device. The water collection device may connect to the drain 140 (e.g., by having the inner ring 114 connect to the bucket lid, main drain opening, etc.) such that water may drain from the filter cleaning stand 100 to the water collection device 300. The platform 130 and the shorter portion 124 may have about the same height so that essentially the entire height of the filter 200 through the opening 126 is visible, or more importantly sprayable, from a water source outside of the filter cleaning stand 100.

The filter cleaning stand 100 may be used in the following way to clean a filter 200. The filter cleaning stand 100 may be attached to the water collection device 300. The filter 200 may be set on the base and wall 120 will be slide over the filter on the base. A water source such as a hose may be used to spray the exposed section (exposed through the opening 126) of the filter 200 in the filter cleaning stand. The water may be sprayed primarily at a downward angle to keep the majority of the water sprayed on the filter 200 from spraying back out of the opening 126. The sprayed water and waste from the filter may mix to form waste-water that may run down the filter 200 on to the top 116 of the base 110 or the platform 130. The wastewater may then pass through the holes 134 and 138 to the drain 140 and then pass through the drain 140 to the water collection device 300. When the exposed section is clean, the wall 120 may be rotated in the filter cleaning stand 100 to expose a new section of the filter 200. The new section may then be cleaned in a similar manner with a majority of the water and waste being collected in the water collection device 300. This may be repeated until all of the filter 200 has been cleaned. The filter 200 may also be flipped over in the filter cleaning stand 100 and cleaned from an inverted position as well.

The filter cleaning stand 100 may be easily manufactured with common materials such as PVC plastics and brass. Because the filter cleaning stand 100 does not require any moving components, construction is much less expensive than the large filter cleaning machines that exist. The filter cleaning stand 100 also has considerable advantages over systems or machines that do not collect the waste-water because cleanup is much easier with the majority of the waste water contained.

Figure 12:
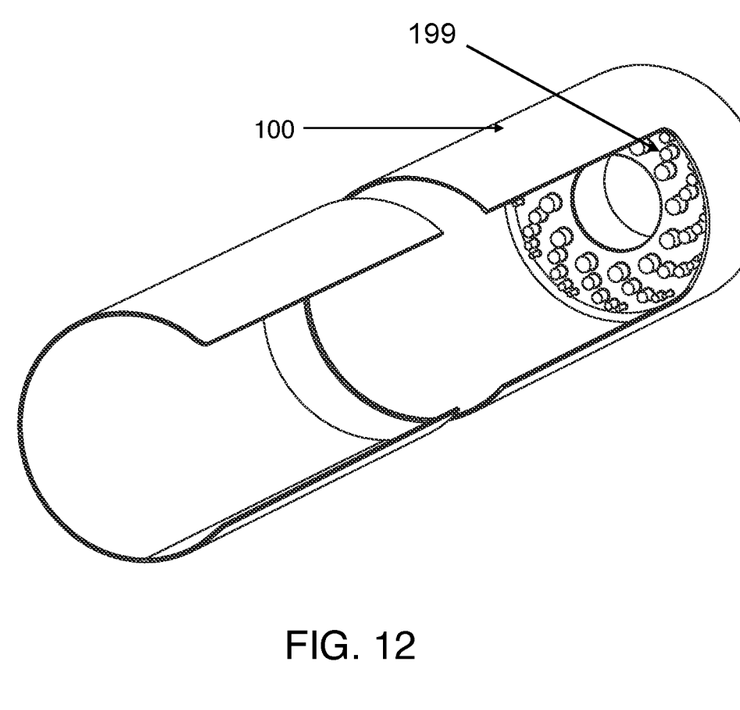
FIG. 12 shows an example front view of a filter cleaning stand.
Figure 13:
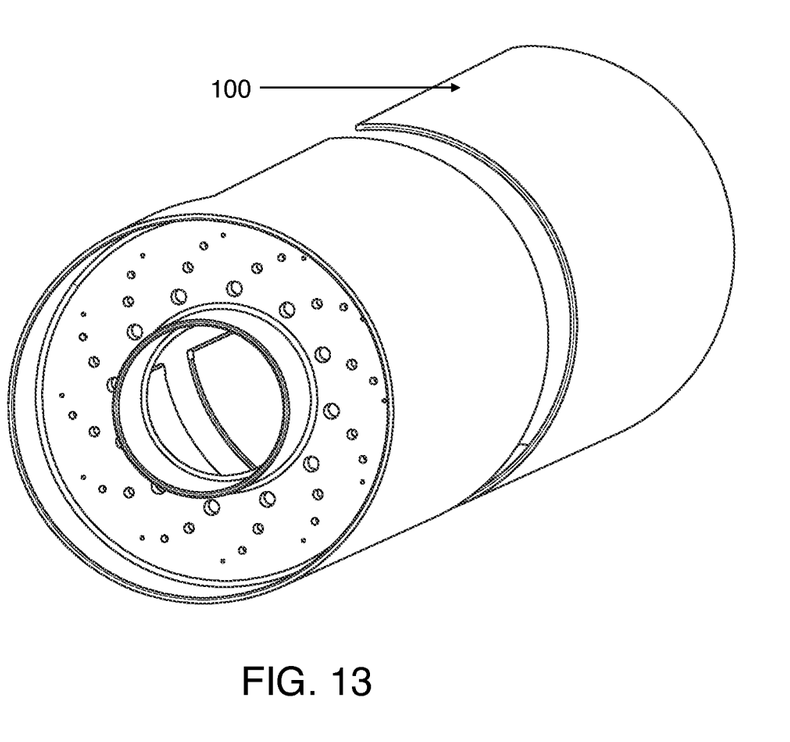
FIG. 13 shows an example bottom-front view of the filter cleaning stand.
Figure 14:
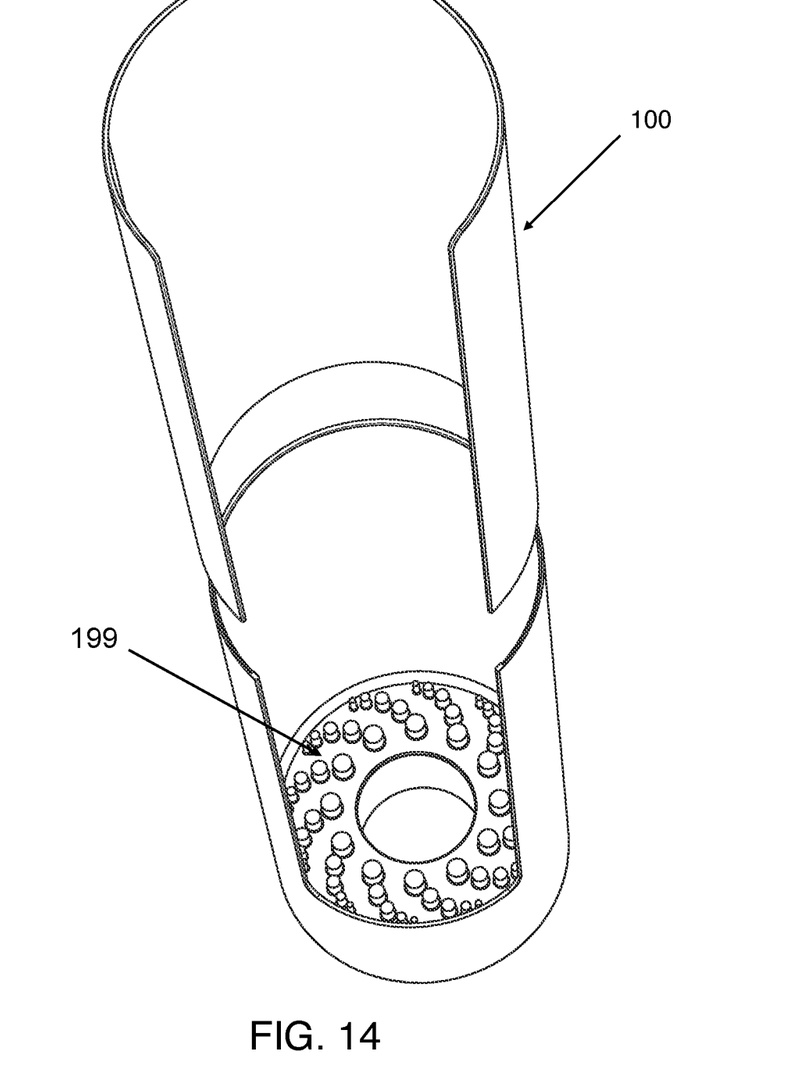
FIG. 14 shows an example front-side view of the filter cleaning stand.

Accordingly, the present description provides for various embodiments for a filter cleaning stand 100. Many uses and advantages are offered by the filter cleaning stand 100 as described above in one or more non-limiting embodiments in the present description. This is also just one example and filter cleaning stand 100 may have any number of shapes and designs such as filter cleaning stand 100 of FIG. 7-11 which has a platform. Another example is filter cleaning stand 100 of FIG. 12-14 which has one or more indents or breaks in wall 120 whereby the curved indents extend inward from vertical edges of the curved surface of wall 120 and a plurality of protrusions 199 on platform 130 to stop plant debris or other particles.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A device comprising:
   a base;
   a platform above and connected to the base, the platform including one or more water permeable holes, wherein the platform at least partially defines a drain; and
   a wall extending up from the base around the platform to hold and partially enclose a filter, wherein the wall includes a first portion and a second portion, the first portion and the second portion defining a generally vertical opening, and the second portion being shorter than the first portion, wherein the first portion has a semi tubular shape with a curved surface extending between an open top and an open bottom configured to receive the filter by a sliding movement, wherein the first portion has curved indents in the first portion, wherein the curved indents extend inward from vertical edges of the curved surface.

2. The device of claim 1, wherein the first portion and the second portion form a circular ring, wherein the second portion is a lip that extends above the base.

3. The device of claim 1, the base including a top, an inner ring extending below the top, and an outer ring extending below the base and extending around the inner ring, wherein the top and the inner ring partially define the drain.

4. The device of claim 3, wherein the top has a ridge for securing the filter.

5. The device of claim 3, further comprising a connector to connect to a collection apparatus positioned below the base, wherein the collection apparatus is a main drain opening, wherein the inner ring is connected to the main drain opening.

6. The device of claim 1, wherein the platform includes legs and a top.

7. The device of claim 6, wherein the one or more water permeable holes in the platform include holes between the legs.

8. The device of claim 6, wherein the one or more water permeable holes in the platform include holes in the top.

9. The device of claim 1, wherein the first portion is at least five times taller than the second portion of the wall.

10. The device of claim 1, wherein the first portion is at least ten times taller than the second portion of the wall.

11. The device of claim 1, wherein the wall extends below the base.

12. A device comprising:
    a base;
    a platform above and connected to the base; and
    a removable wall extending up from the base around the platform to partially encompass a filter, wherein the wall includes a first portion and a second portion, the first portion and the second portion defining an opening, and the second portion being shorter than the first portion, wherein the first portion has a semi open tubular shape with a curved surface extending between an open top and an open bottom configured to receive the filter by a sliding movement, wherein a top of the base has a plurality of protrusion sets wherein the protrusion sets are in a swirl formation extending from an outer perimeter inwards.

13. The device of claim 12, the platform including one or more water permeable holes, wherein the platform at least partially defines a drain.

14. The device of claim 12, the base including a recessed cavity with three protrusions around a drain that are rectangular in shape symmetrically extending inward.

15. The device of claim 14, wherein the top of the base has a disc shape with a hole at a center, wherein the top has a ridge for securing the filter.

16. The device of claim 15, wherein the top of the base and the wall form a cup shape around the drain.

17. The device of claim 12, further comprising a collection apparatus positioned below the base, wherein the collection apparatus is a main drain opening, wherein an inner ring of the device is connected to the main drain opening.

* * * * *